United States Patent [19]
van Amerongen et al.

[11] Patent Number: 6,031,118
[45] Date of Patent: Feb. 29, 2000

[54] STANOL ESTER COMPOSITION AND PRODUCTION THEREOF

[75] Inventors: Marnix P. van Amerongen, Vlaardingen, Netherlands; Lourus Cornelis Lievense, Valinhos, Brazil

[73] Assignee: Lipton, Division of Conopco, Inc., Englewood Cliffs, N.J.

[21] Appl. No.: 09/135,720

[22] Filed: Aug. 18, 1998

[30] Foreign Application Priority Data

Aug. 22, 1997 [EP] European Pat. Off. ............. 97202596

[51] Int. Cl.⁷ .................................................. C07J 9/00
[52] U.S. Cl. .................... 552/544; 552/545; 426/611; 426/602; 426/603
[58] Field of Search .......................... 514/182; 552/544, 552/545; 426/602, 603, 611

[56] References Cited

U.S. PATENT DOCUMENTS

| | | | |
|---|---|---|---|
| 4,806,632 | 2/1989 | McCoy et al. | 536/124 |
| 5,502,045 | 3/1996 | Miettinen et al. | 514/182 |
| 5,734,070 | 3/1998 | Tacke et al. | 554/144 |

FOREIGN PATENT DOCUMENTS

| | | |
|---|---|---|
| 792 107 | 5/1996 | European Pat. Off. . |
| 743 014 | 11/1996 | European Pat. Off. . |
| 62-055040 | 10/1987 | Japan . |
| 1 405 346 | 9/1973 | United Kingdom . |
| 92/19640 | 11/1992 | WIPO . |
| 96/38047 | 12/1996 | WIPO . |
| 98/01126 | 1/1998 | WIPO . |
| 98/06405 | 2/1998 | WIPO . |
| 98/19556 | 5/1998 | WIPO . |

*Primary Examiner*—James H. Reamer
*Attorney, Agent, or Firm*—Gerard J. McGowan, Jr.

[57] ABSTRACT

Stanol fatty acid ester composition comprising at least 85% of stanol (saturated) fatty acid esters in which at least 85% of the fatty acid groups are saturated. Also claimed is a process for the preparation of stanol fatty acid esters, by hardening phytosterol fatty acid or a mixture thereof, or as an alternative, a process for the preparation of stanol fatty acid esters by esterification of phytosterols or a mixture thereof, followed by the hardening of the so obtained phytosterol fatty acid esters.

11 Claims, No Drawings

STANOL ESTER COMPOSITION AND PRODUCTION THEREOF

BACKGROUND OF THE INVENTION

The present invention concerns a method for the production of stanol fatty acid esters, a stanol fatty acid ester composition, and the use thereof in food products, in particular in fat based food products in amounts sufficient to obtain a blood cholesterol lowering effect if the food product is used according to the common needs of the consumer.

Fatty acid esters of phytosterols and/or phytostanols are hydrolyzed in the gut and the subsequent free phytosterols and/or phytostanols will inhibit the absorption of cholesterol thereby lowering the blood cholesterol. Free phytosterols and/or phytostanols themselves are hardly absorbed. Indications in literature are that phytostanols are absorbed even in a lesser extend than phytosterols. The use of phytostanols in fat based food products to lower blood cholesterol could therefore be preferred over the use of phytosterols.

In U.S. Pat. No. 5,502,045 (Raision Tehtaat Oy AB) a substance of beta-sitostanol fatty acid ester is described produced by 1. solvent hardening of beta-sitosterol followed by 2. esterification of the formed beta-sitostanol with fatty acids. The so formed mixture of beta-sitostanol fatty acid esters can be used as such or added to a food.

There are several disadvantages to this production method, of which the most severe is that the beta-sitosterol should first be solubilized in a solvent (e.g. ethylacetate, butanol, ethanol) before the hardening of the sterol can be performed. Because the solubility of beta-sitosterol, or phytosterols in general, in solvents is rather limited, the hardening step is relatively expensive operation because of high solvent costs and high costs of hardening equipment of relative large volume. Moreover, the solvents needs to be recovered after the hardening process is completed, and suitable locations for above hardening process will be limited because of environmental regulations. Furthermore, in a process aiming at the production of a food ingredient, removal of all solvents is essential, this making the process even more expensive.

SUMMARY OF THE INVENTION

It has now been found that phytostanol fatty acid esters can be suitably prepared by the esterification of phytosterols, followed by hardening of the so formed phytosterol fatty acid esters. This method has the advantage that no solvents in the hardening step are needed since the phytosterol-esters are in a liquid form by themselves. Moreover, besides this method is solvent free and environmentally friendly, and thus not requiring specific legal admissions, it is also more cost effective due to the fact that less raw materials, equipment and labour is required. In another embodiment, the stanol fatty acid esters are prepared by hardening phytosterol fatty acid esters or a mixture thereof.

Where in this application sterols are mentioned, phytosterols (4-desmethylsterols, 4-monomethylsterols and 4,4'-dimethylsterols, and/or mixtures thereof) are meant. These sterols can be found in several plant materials.

Sources are described in, for example, PCT/EP96/02344. For this invention, a preference exists for sterols from vegetable oil.

For obtaining the sterolesters before hardening is carried out, the sterols are esterified with one or more $C_{2-24}$ fatty acids. For the purpose of the invention the term $C_{2-24}$ fatty acid refers to any molecule comprising a $C_{2-24}$ main chain and at least one acid group. Although not preferred within the present context the $C_{2-24}$ main chain may be partially substituted or side chains may be present. Preferably, however the $C_{2-24}$ fatty acids are linear molecules comprising one or two acid group(s) as endgroup(s). Most preferred are linear $C_{8-22}$ fatty acids as occur in natural oils. Suitable esterification conditions are for example described in WO 92/19640.

Suitable examples of any such fatty acids are acetic acid, propionic acid, butyric acid, caproic acid, caprylic acid, capric acid. Other suitable acids are for example citric acid, lactic acid, oxalic acid and maleic acid. Preferred are lauric acid, palmitic acid, stearic acid, arachidic acid, behenic acid, oleic acid, cetoleic acid, erucic acid, elaidic acid, linoleic acid and linolenic acid.

Most preferred are the C18 polyunsaturated, monounsaturated or saturated fatty acids like stearic acid, oleic acid, elaidic, linoleic acid, alpha-linolenic acid and gamma-linolenic acid, since after fully hardening of sterolesters comprising these fatty acids, the fatty acid part will be the saturated stearic acid, which has a neutral effect on blood cholesterol.

When desired a mixture of fatty acids may be used. For example it is possible to use a natural occurring fat or oil as a source of the fatty acid and to carry out the esterification via an interesterification reaction. Most preferred are fatty acid mixtures containing high amounts (>70%) of C18 polyunsaturated, monounsaturated or saturated fatty acids such as fatty acid mixtures of sunflower, safflower, rapeseed, linseed, linola and/or soybean.

The fatty acid ester stanols so obtained are also subject of this invention. These stanol esters, of which >85%, preferably >90%, and most preferably >95% are saturated stanol esters which are formed by the hardening of esterified sterols, will be of a very different nature when compared to the stanol esters prepared by hardening and subsequent esterification.

These saturated fatty acid stanol esters were found to have stronger structuring properties than stanolesters mixtures comprising mainly mono- or poly-unsaturated fatty acids, due to their higher melting points. By using the so produced stanolesters with saturated fatty acids, the amount of hardstock required to make a spreadable product out of above mentioned liquid oils can be more reduced than with stanolesters mixtures comprising mainly mono- or poly-unsaturated fatty acids, thereby potentially optimizing the amount of PUFA rich glycerides in the product further, and thereby compensating the saturated fatty acid part of the stanol ester mixture applied in the product.

The stanol (saturated) fatty acid ester (mixture) of this invention may still comprise some unhardened and/or unesterified sterols and/or sterol esters. It is preferred, however, that the stanol ester mixture of the invention comprises at least 85% of the stanol (saturated) fatty acid esters, and preferably at least 90%, with a most preferred embodiment being found in 95 to about 100% being stanol (saturated) fatty acid esters. In another embodiment, the invention concerns stanol fatty acid ester compositions comprising at least 85% of stanol fatty acid esters in which at least 85% of the fatty acid groups are saturated.

Also subject of the invention are food products, in particular fat based food products, comprising the stanol (saturated) fatty acid ester (mixtures) in all embodiments set forth above. It is preferred that the food product comprises at least 1%, and preferably at least 2% and more preferably at least 5% stanol equivalents (present as stanol fatty acid esters).

The use of these stanolesters in food products has the advantage that no regular intake of supplements is needed, and that through the normal food pattern, a significant reduction of the cholesterol level can be obtained. The use of the stanol esters of this invention is in particular preferred in fat based food products, this type of food products being part of the daily menu in most western world countries.

Fat based food products are food products (partially) based on fat and regarded by the consumer, as 'fatty type of products'. Examples are yellow fat spreads (containing vegetable fat and/or animal fat such as butterfat), dressings, coffee-creamer, shortenings, cooking and frying oils, fillings and toppings, ice-cream and the like. These products in most cases comprise a particular amount of fat.

In some cases, however, products are still regarded as 'fatty type of products', despite a replacement of part or even all the fat by fat replacers. Fat based food products in which the fat is partially or completely replaced by fat replacers are also covered by the term fat based food products of this invention.

The food products as such are common products in the western world, and are used by consumers on a daily basis in amounts different for each individual. The invention is in particular very suitable for yellow fat spreads, dressings, cheese, shortenings, cooking and frying oils and ice cream, with a preference for yellow fat spreads, mayonnaise, dressings, shortenings, cooking and frying oils. On the basis of habits of the consumer in the western world, the preferred applications are yellow fat spreads (including margarines, butter and low fat spreads) and dressings. Yellow fat spreads, for this invention, can comprise 0 (zero) to 90% fat (usually 5–80%). Dressings can comprise 0 to 85% fat (usually 5–80%), shortenings, cooking and frying oil more than 95% fat.

In such products, a further preference exists for the use of stanol equivalents (present as stanol fatty acid esters) of this invention of at least 3 wt. %, and more preferred of at least 5 wt. %, with a further preference for at least 7 wt. %.

The preparation of the fat based food products comprising the saturated stanol fatty acid esters of the invention can be carried out in any suitable manner commonly known. Suitably, the stanol esters, which will often be a mixture of different stanol esters, can be added and dissolved to the fat prior to combining with the aqueous phase of the product to be prepared.

In a preferred embodiment, the food product is a yellow fat spread comprising 0 to 80% fat and at least 1 wt. %, preferably at least 2 wt. % and more preferably at least 5 wt % stanol equivalents (present as stanol esters prepared according to the invention). In its most preferred embodiment, the amount of stanol equivalents is at least 5%, with optimal results found when the amount of stanol is in the range of 7–15%.

The invention is in particular suitable for low fat spreads having a fat level in the range of 0–40%, where the amount of cholesterol level reducing fat is low. However, another preference exists for higher fat level spreads (60–80% fat), as a very significant reduction of cholesterol level in the blood serum can be obtained when high PUFA fat level fats are used, and where the fat in the spread is not optimized on PUFA, to add the cholesterol lowering effect upon use to such spreads.

The fat that is applied in these fat based food products can be any fat, such as dairy fat and/or vegetable fat. However, if fat is present, for health reasons the use of one or more vegetable fat sources is preferred. In particular, the use of liquid fats is preferred. The fat can be one single fat or a blend. The use of fat compositions comprising a considerable amount of PUFA rich triglycerides in addition to the use of the stanol (saturated) fatty acid ester (mixture) is in particular considered highly beneficial. For example, oils of sunflower, safflower, rapeseed, linseed, linola and/or soybean can be used in a preferred embodiment. Also the fat compositions mentioned in Netherlands patent documents no. Nl 143115, Nl 178559, Nl 155436, Nl 149687, Nl 155177, European patent documents EP 41303, EP 209176, EP 249282, and EP 470658 are highly suitable.

If a fat blend is used, it is preferred that it comprises at least 30%, and more preferred at least 45% of polyunsaturated fatty acids, based on the total weight amount of the fat in the fat based food product. So, a strong effect on the cholesterol lowering effect is obtained if use is made of the stanol (saturated) fatty acid esters as set forth in this application in a food product in which a fat blend comprising at least 30 wt. % of PUFA rich triglycerides is used.

As fat spreads are a commonly and daily used product in western food eating habits, a preference exists for the use of the stanol (saturated) fatty acid esters in all the preferred embodiments as set forth above, in fat spreads.

Where butterfat is used for preparing spreads of the invention, or where the spreads are butter, it is preferred that the amount of stanol equivalents is at least 5 wt. % with optimal results found when the amount of stanol equivalents is in the range of 10–15 wt. %. As the consumption of butter is considered less beneficial for consumers health, the present invention is in particular suitable for making butter or butter-melanges containing spreads, as the negative effect associated with the butter consumption can be minimized or even reversed.

EXAMPLES

Example 1a

Hydrogenation of Steryl Esters

A mixture of sterols derived from soybean oil distillates esterified with sunflowerseed oil fatty acids (to an esterification degree >85%) was hydrogenated on laboratory scale. As catalyst 5 wt % Pd on activated carbon was used. To 0.5 kg of the sterylesters 2 g of catalyst was added and the mixture was heated to 90 degrees C. under reduced pressure 5–30 mbar.

The hydrogenation was carried out at 90 degrees C. and at 3 bar hydrogen pressure. After 90 minutes approximately 40% of the theoretical amount of hydrogen was absorbed and again 2 g of catalyst was added. After 7.5 hours approx. 80% of the theoretical amount of hydrogen was absorbed and 2 g of catalyst was added and the temperature increased to 95–115 degrees C. Finally, after 11 hours of reaction approx. 100% of the theoretical amount of hydrogen was absorbed. At that moment no extra hydrogen was absorbed anymore and the hydrogenation was ended.

The major part of the catalyst was removed by filtration over a paper filter. The remaining part of the catalyst was removed by applying 2% Hyflow and filtration over a paper filter.

Analysis indicated that a hardening conversion of over 90% was achieved.

Example 2a

Preparation of a Spread 70% Fat (Stanol Esters Ex. 1a)

Refined sunflower oil (65% PUFA as linoleic acid) was enriched with esterified stanols as obtained from Example 1a (to a total stanol equivalent concentration of 45%). Of this stanol-ester concentrate, 22 parts were mixed with 35 parts of normal refined sunflower oil, 15 parts of refined rapeseed oil and 8 parts of a refined interesterified mixture of 65 parts fully hardened palm oil and 35 parts fully hardened palm kernel oil. To this fat blend, small amounts of soybean lecithin, monoglyceride, flavours and beta-carotene solution were added.

To 18 parts water, small amounts of whey protein powder, flavour, and citric acid were added to obtain a pH of 4.8.

80 parts of the fat phase composition (containing 70% of fat) and 20 parts of the aqueous phase composition were mixed and kept at 60 degrees C. The mixture was then passed through a Votator line with 2 scraped surface heat exchangers (A-units) and 1 stirred crystallizer (C-unit) in AAC-sequence operating at 800, 800 and 100 rpm respectively. The product leaving the C-unit had a temperature of 11 degrees C. It was filled into tubs and stored at 5 degrees C. A good and stable, high PUFA, high fat-continuous spread enriched with 10% stanol equivalents (mainly present as C18:0 stanol esters) was obtained.

Example 3a

Preparation of a Spread 40% (Stanol Esters Ex. 1a)

Refined sunflower oil (65% PUFA as linoleic acid) was enriched with esterified stanols as obtained from Example 1a (to a total stanol equivalent concentration of 45%). Of this stanol-ester concentrate, 22 parts were mixed with 23 parts of normal refined sunflower oil and with 5 parts of a refined interesterified mixture of 50 parts fully hardened palm oil and 50 parts fully hardened palm kernel oil. To this fat blend small amounts of soybean lecithin, monoglyceride and beta-carotene solution were added.

To 44 parts water, gelatin and small amounts of whey protein powder, flavours, preservative and citric acid were added to obtain a pH of 4.7.

50 parts of the fat phase composition (containing 40% of fat) and 48 parts of the aqueous phase composition were mixed and kept at 60 degrees C. The mixture was then passed through a Votator line with 2 scraped surface heat exchangers (A-units) and 2 stirred crystallizers (C-unit), in ACAC-sequence operating at 500, 1000, 600 and 100 rpm respectively. The product leaving the last C-unit had a temperature of 10 degrees C. It was filled into tubs and stored at 5 degrees C. A good and stable, high PUFA, low fat-continuous spread enriched with 10% stanol equivalents (mainly present as C18:0 stanol esters) was obtained.

Example 4a

Preparation of a Dressing (Stanol Esters Ex. 1a)

49 parts of water is mixed with 11 parts of various flavour components, preservatives, thickeners and emulsifiers. The mixture is thoroughly mixed in a stainless steel stirred vessel. To this aqueous mixture 20 parts of sunflower oil (65% PUFA as linoleic acid) enriched with 40% stanol equivalents present as stanol esters as obtained from Example 1a is added. To above oil in water mixture, 20 parts of normal refined sunflower oil is added, thoroughly mixed for an additional 15 min, to obtain a pre-emulsion. The pre-emulsion is brought into a colloid mill (Prestomill PM30) and processed at a split-size between level 15 and 20 and a throughput between level 4 and 6. A good and stable water continuous dressing enriched with 8% stanol equivalents (mainly present as C18:0 stanol esters) is obtained.

What is claimed is:

1. Stanol fatty acid ester composition comprising at least 85% of stanol fatty acid esters in which at least 85% of the fatty acid groups are saturated.

2. Stanol fatty acid ester composition according to claim 1, wherein at least 90% of the fatty acid groups are saturated fatty acid groups.

3. Process for the preparation of stanol fatty acid esters, by hardening phytosterol fatty acid esters or a mixture thereof.

4. Process for the preparation of stanol fatty acid esters by esterification of phytosterols or a mixture thereof, followed by the hardening of the so obtained phytosterol fatty acid esters.

5. Process according to claim 4, wherein both esterification and hardening step are performed in the absence of a solvent.

6. Process according to claim 3, wherein the hardening treatment is carried out such that at least 85% of the sterol fatty acid esters is hardened.

7. Food product comprising a stanol fatty acid ester according to claim 1.

8. Food product according to claim 7, wherein at least 1 wt %, and preferably at least 2 wt % stanol equivalents (present as stanol fatty acid esters) are present.

9. Food product according to claim 7, wherein the food product is a fat based food product.

10. Food product according to claim 9, wherein the fat based food product is a yellow fat spread, which preferably comprises at least 5 wt % of the stanol equivalents (present as stanol fatty acid esters).

11. Food product according to claim 9, wherein the fat or fat blend used in the product comprises at least 30 wt %, and preferably at least 45 wt % of PUFA rich triglycerides, calculated on the total weight of the fat present in the product.

\* \* \* \* \*